United States Patent [19]

Sommer

[11] Patent Number: 4,872,525

[45] Date of Patent: Oct. 10, 1989

[54] DRIVE SYSTEM FOR A MOTOR VEHICLE COMPRISING MEANS FOR PERMANENTLY DRIVING A FIRST PAIR OF WHEELS AND AUTOMATICALLY OPERABLE MEANS FOR SELECTIVELY DRIVING A SECOND PAIR OF WHEELS

[75] Inventor: Hans D. Sommer, Graz, Austria

[73] Assignee: Steyr-Daimler-Puch AG, Vienna, Austria

[21] Appl. No.: 271,101

[22] Filed: Nov. 14, 1988

[30] Foreign Application Priority Data

Nov. 23, 1987 [AT] Austria .............................. A3073/87

[51] Int. Cl.$^4$ .......................................... B60K 17/344
[52] U.S. Cl. .................................... 180/197; 180/233; 364/424.1; 364/426.03
[58] Field of Search ........................ 180/197, 233, 247; 364/424.1, 426.03

[56] References Cited

FOREIGN PATENT DOCUMENTS 3437436 8/1986 Fed. Rep. of Germany .
2104178 3/1983 United Kingdom .
2172863 10/1986 United Kingdom .

OTHER PUBLICATIONS

"Automotive Technology Moves the World", XXI Fisita Congress, Belgrade, June 2–6, 1986.

*Primary Examiner*—John A. Pekar
*Attorney, Agent, or Firm*—Marmorek, Guttman & Rubenstein

[57] ABSTRACT

In the operation of a drive system for a motor vehicle comprising means for permanently driving a first pair of wheels and automatically operable means for selectively driving a second pair of wheels in dependence on the slip of the first pair of wheels, a frequent change between a four-wheel drive mode and a two-wheel drive mode for measuring purposes and for speed compariosn should not be required and this should be achieved with structurally simple means. To that end two sensors are respectively associated with the two permanently driven wheels and are operable to generate speed signals representing the speeds of said two wheels and to deliver said signals to a computer, which derives an actual speed difference signal from said speed signals and in which respective characteristic speed differences, which are specific to the vehicle, are stored for the two-wheel drive mode and for the four-wheel drive mode. Said computer is operable to compare said actual speed difference signal with a current reference speed difference which depends on that of said stored characteristic speed differences which is associated with the current mode and in dependence on the result of said comparison to control a final control element for changing the power train from the two-wheel drive mode to the four-wheel drive mode when the comparison indicates that the actual speed difference exceeds the current reference speed difference and from the four-wheel drive mode to the two-wheel drive mode when the comparison indicates that the actual speed difference is lower than the current reference speed difference.

6 Claims, 2 Drawing Sheets

DRIVE SYSTEM FOR A MOTOR VEHICLE COMPRISING MEANS FOR PERMANENTLY DRIVING A FIRST PAIR OF WHEELS AND AUTOMATICALLY OPERABLE MEANS FOR SELECTIVELY DRIVING A SECOND PAIR OF WHEELS

BACKGROUND OF THE INVENTION

1. Field of the Invention

This invention relates to a drive system for a motor vehicle comprising means for permanently driving a first pair of wheel and automatically operable means for selectively driving a second pair of wheels in dependence on the slip of the first pair of wheels.

2. Description of the Prior Art

It is known that the slip of two permanently driven wheels of a motor vehicle can be determined in that their speed is compared with the speed of the wheels which can selectively be driven and that the latter wheels may be driven too when the slip of the permanently driven wheels exceeds a predetermined limit (FISITA Belgrade, June 2 to 6, 1986, Proceedings, Volume 2, pages 277 to 283). During a four-wheel drive operation the selectively driven wheels must mechanically be disconnected from the power train in shortly succeeding intervals of time to permit a renewed comparison of the slip of the permanently driven wheels and of the selectively drivable wheels so that it can be ascertained whether the slip of the permanently driven wheels is still so high that the four-wheel drive operation is called for. Without such a mechanical disconnection of the selectively driven wheels from the power train it would not be possible to detect a speed difference between the permanently driven wheels and the selectively driven wheels unless the means for driving the selectively drivable wheels include a differential or a liquid friction coupling. A clutch for the intermittent connection and disconnection of the selectively driven wheels to and from the power train in short intervals of time will be required to perform a cyclical operation under high load, and a differential which may be employed will increase the structural expenditure to an extent which may not be justified in some cases.

SUMMARY OF THE INVENTION

For this reason it is an object of the invention to eliminate said disadvantages and so to improve a drive system of the kind described first hereinbefore that a frequent change between a four-wheel drive mode and a two-wheel drive mode for measuring purposes and for speed comparison will no longer be required and to achieve this with structurally simple means.

That object is accomplished in accordance with the invention in that two sensors are respectively associated with the two permanently driven wheels and are operable to generate speed signals representing the speeds of said two wheels and to deliver said signals to a computer, which derives an actual speed difference signal from said speed signals and in which respective characteristic speed differences, which are specific to the vehicle, are stored for the two-wheel drive mode and for the four-wheel drive mode, said computer is operable to compare said actual speed difference signal with a current reference speed difference which depends on that of said stored characteristic speed differences which is associated with the current mode and in dependence on the result of said comparison to control a final control element for changing the power train from the two-wheel drive mode to the four-wheel drive mode when the comparison indicates the actual speed difference exceeds the current reference speed difference and from the four-wheel drive mode to the two-wheel drive mode when the comparison indicates that the actual speed difference is lower than the current reference speed difference.

This invention is based on the recognition that there will always be speed differences between the two permanently driven wheels when the vehicle is traveling and that said speed difference will be much lower on a dry road having a high coefficient of friction than, for instance, on a wet road having a lower coefficient of friction or on a dry road when there is a large axle load transfer, i.e., a relatively high slip. The characteristic speed differences stored in the computer are empirically determined characteristic values for those conditions of travel under which the slip approaches limiting values at which it is still possible to proceed in a two-wheel drive mode or at which a change from the four-wheel drive mode to the two-wheel drive mode is permissible. For this reason a comparison between the speed of the permanently driven wheels and the speed of the selectively driven wheels is no longer required as well as a frequent interruption of the four-wheel drive mode for measuring purposes.

It is known that the wheels of a given axle will rotate at different speeds when the vehicle is cornering and such speed differences will not be due to different coefficients of road friction. That fact can be taken into account, particularly during a travel along large bends, in that a steering angle sensor is connected to the computer and the actual speed difference signal derived by the computer is corrected in dependence on the steering angle.

In order to minimize the frequency of the changeovers between the two-wheel drive mode and the four-wheel drive mode, a sensor for detecting the load on the motor of the motor vehicle is connected to the computer and the computer is arranged to maintain the previous mode when the motor vehicle is coasting or when the motor is disconnected from the remainder of the drive system.

It has been mentioned hereinbefore that the speed difference between the two permanently driven wheels will change also in response to a high dynamic axle load transfer during a travel on a dry road. That fact can be taken into account in that the reference speed differences are derived under the control of axle load sensors.

Within the scope of the invention a brake application detector and a speed of travel sensor are connected to the computer and under the control of the brake application sensor and of the speed of travel sensor the computer is arranged to effect a change from the four-wheel drive mode to the two-wheel drive mode when the speed of travel sensor indicates a speed of travel above a predetermined limit and the brake application sensor indicates a brake application.

DETAILED DESCRIPTION OF THE PREFERRED EMBODIMENT

Figure 1:
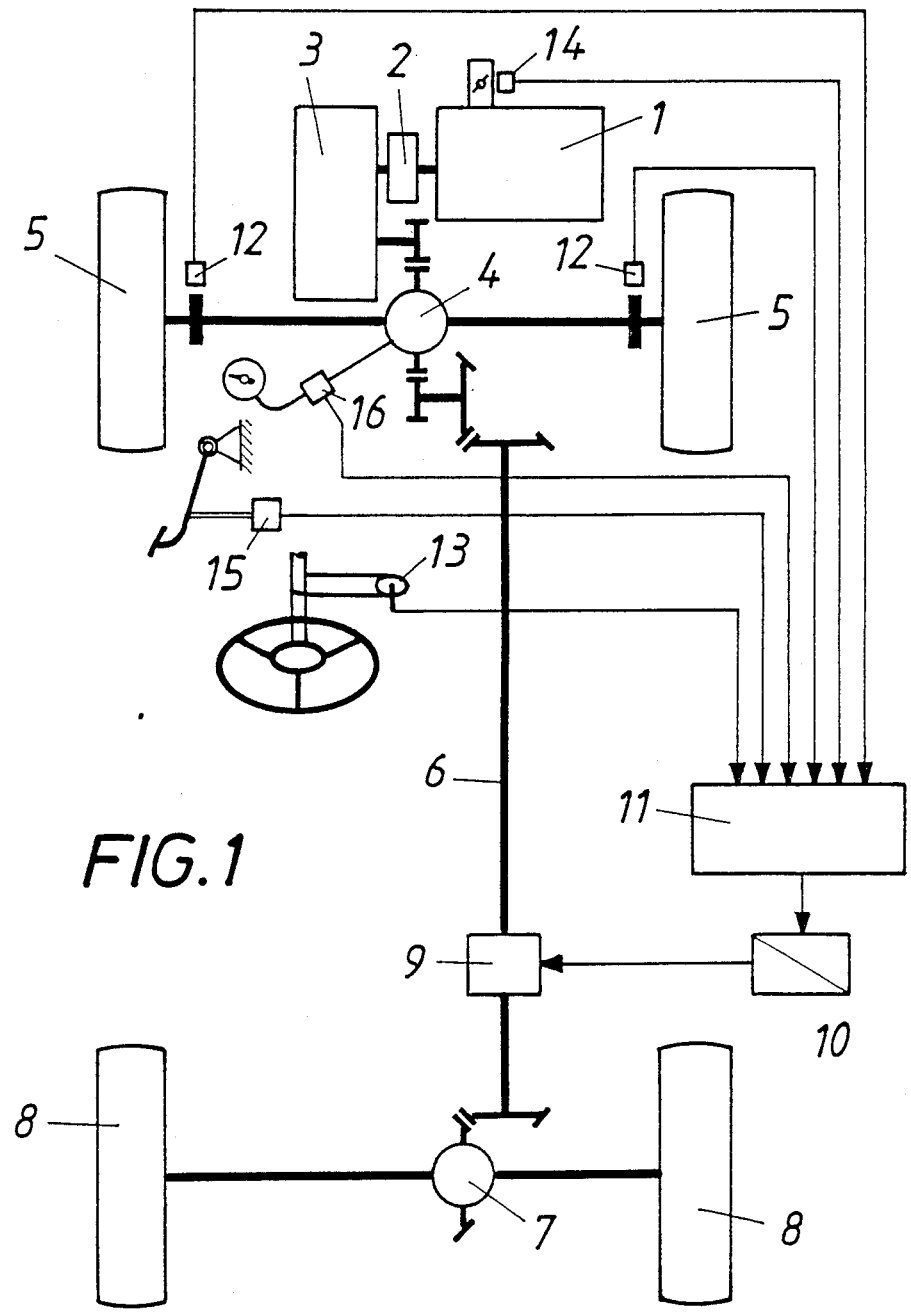
FIG. 1 is a diagrammatic representation of a power train.

The front wheels 5 of a motor vehicle are permanently driven by a motor 1 via a main clutch 2 and a change-speed transmission 3 and a differential 4. The differential 4 is connected by a power train 6 to a differential 7 for driving the selectively driven rear wheels 8. The power train 6 comprises a mode changing clutch 9 for changing between a two-wheel drive mode and a four-wheel change mode. The mode changing clutch 9 is controlled by a final control element 10, which is controlled by a computer 11, which receives data signals from various sensors.

Two sensors 12 are associated with the two front wheels 5 and deliver to the computer 11 signals representing the speeds of the two front wheels so that the computer can derive from said signals the actual speed difference between the front wheels 5. Another sensor 13 delivers a steering angle signal which represents the steering angle to the computer. A further sensor 14 connected to the computer 11 is associated with the throttle of the carburetor of the motor 1 and delivers a motor load signal representing the current load on the motor 1. A brake application sensor 15 for detecting a brake application is associated with the brake pedal and a speed of travel sensor 16 for delivering a speed of travel signal is associated with the tachometer. The computer 11 receives also signals indicating whether the final control element 10 is in a condition for the two-wheel drive mode or the four-wheel drive mode.

Figure 2:
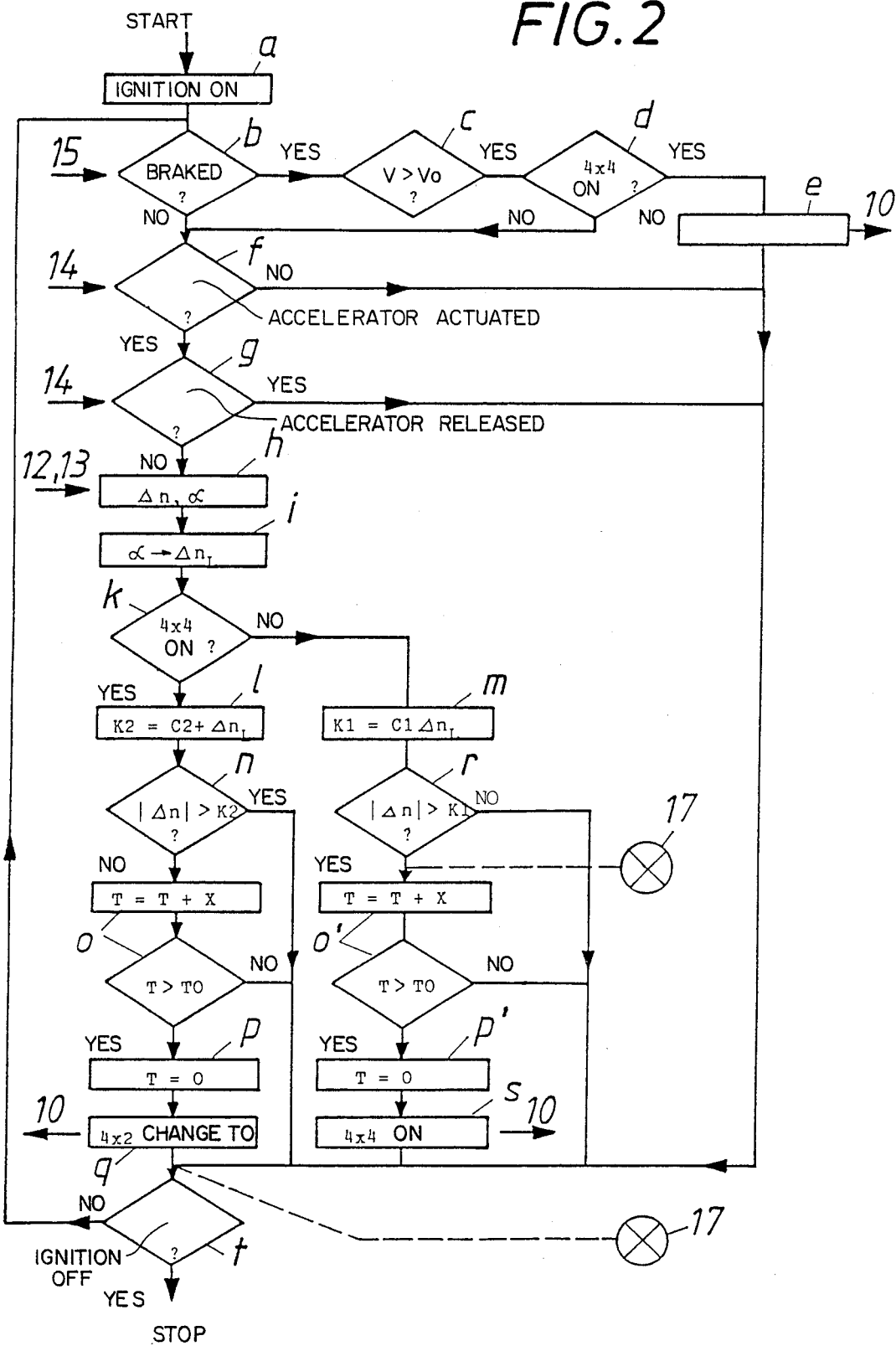
FIG. 2 is a corresponding flow scheme.

The program for the operation of the computer 11 is represented by a flow scheme in FIG. 2.

When the ignition circuit of the vehicle is energized, the computer receives the command START (box a). After the start, the signals from 15 are used in a decision logic loop b for a check whether there is a brake application. If the answer is YES, the signals from 16 are used in another decision logic loop c for a check whether the instantaneous speed of travel exceed a predetermined limit $v_o$. If the answer is NO, the computer will operate as if the vehicle were not braked. If the answer is YES, the decision logic loop d will be performed to check whether the vehicle is operated in the four-wheel drive mode. If the answer is NO, the computer 11 will return to the main program. If the answer is YES, the computer will deliver to the final control element 10 a command for a change to the two-wheel drive mode (box e). When that command has been performed, a new program cycle will be initiated.

When the answer NO is obtained from the logic loops b, c, d, the main program will be continued as follows: A logic loop f is performed for a check whether the accelerator is actuated. The next loop g is performed for a check whether the accelerator pedal has been released. Signals from the sensors 14 are used in the two loops f and g. When the accelerator is not actuated (loop f) or when it has been released (loop f), a new program cycle will be initiated. If the pedal is actuated and is not released, the computer 11 will be operated to derive the actual speed difference $\Delta n$ from the speed signals delivered by the sensors 12 and the sensor 13 will deliver to the computer the steering angle signal indicating the angle $\alpha$ through which the steering wheel has been rotated. From the data thsu received in step h the computer computes in step i a corrected speed difference $\Delta n_L$ which has been corrected in dependence on the steering angle. That corrected speed difference is used for the subsequent computations. A loop k is performed to check whether or not the vehicle is operating in the four-wheel drive mode. In dependence on the result of that check, one of the reference speed differences $K_1$ and $K_2$ is determined, which respectively depend on the characteristic speed differences $C_1$ and $C_2$ and on the corrected speed difference $\Delta n_L$. The reference speed difference $K_1$ is used for the comparison indicating whether or not a change to the four-wheel drive mode is required. The reference speed difference $K_2$ is used for a comparison indicating whether or not a change to the two-wheel drive mode is called for. The two computing stages are designated l and n. When the vehicle is operating in the four-wheel drive mode, i.e., the reference speed difference $K_2$ is significant, a logic step n will be performed to check whether the absolute value of the actual speed difference $|\Delta n|$ exceeds the current reference speed difference $K_2$. If the answer is YES, the operation in the four-wheel drive mode will be continued and the computer will start the next program cycle. If the answer is NO, a check may be made whether a change command is instantaneously called for. To that end an instantaneous value can be determined in an event counter or loop counter which is incremented after each program cycle. The value T is then compared in a logic loop o with a preset $T_O$. If T exceeds the preset value $T_O$, the next step p will be performed, in which the value T for the program is zeroed. The change command "change to two-wheel mode" is then given in step q.

When the check in loop k indicates that the vehicle is not operating in the four-wheel mode, a logic loop r will be performed to check whether $|\Delta n|$ exceeds the reference speed difference $K_1$. If the answer is YES, the program will be continued, optionally in consideration of the number of events or of the time in loop o' and with a resetting of T to zero if T exceeds $T_O$ in loop p' and the command for a change to the four-wheel mode will be given in step s. If the check in the logic loop r indicates that the absolute value of the actual speed difference $|\Delta n|$ exceeds $K_1$, a warning lamp 17 may be lighted, which will automatically be extinguished when the four-wheel drive mode has been started. The program will be continued as long as the ignition circuit is energized. The program will be stopped when the deenergization of the ignition circuit is detected in a logic loop t.

I claim:

1. In a drive system for a motor vehicle comprising means for permanently driving a first pair of wheels and automatically operable means for selectively driving a second pair of wheels in a four-wheel drive mode in dependence on the slip of the first pair of wheels, the improvement residing in that two speed sensors are operatively associated with respective ones of said permanently driven wheels and arranged to deliver actual speed signals representing the speeds of said permanently driven wheels, a computer is provided, which is connected to said speed sensors and arranged to derive from said actual speed signals an actual speed difference and in which a first characteristic speed difference associated with a two-wheel drive mode and a second characteristic speed difference associated with a four-wheel drive mode are stored, said characteristic speed differences being specific to a vehicle for which the drive system is intended, a final control element is provided for effecting in said drive system under the control of said computer a change between said four-wheel drive mode and a two-wheel drive mode in which only said first pair of wheels are driven, said computer is operable to make a comparison between said actual speed difference and a current reference speed difference which depends on that of said stored characteristic speed differences which is associated with the currently used one of said modes and to control said final control element for a change from the two-wheel drive mode to the four-wheel drive mode when said comparison indicates that said actual speed difference exceeds said current reference speed difference, and for a change from the four-wheel drive mode to the two-wheel drive mode when said comparison indicates that said actual speed difference is smaller than said current reference speed difference.

2. The improvement set forth in claim 1, wherein
a steering angle sensor for delivering to said computer a steering angle signal representing the steering angle of said vehicle is connected to said computer, said computer is operable to derive a corrected speed difference from said speed signals and said steering angle signal and to derive said reference speed signal from said stored characteristic speed difference and said corrected actual speed difference.

3. The improvement set forth in claim 1 as applied to a drive system comprising a motor for driving a motor vehicle, wherein
a motor load sensor for delivering to said computer a motor load signal representing the load on said motor is connected to said computer and said computer is arranged to inhibit said final control element against a change from one of said modes to the other when said motor load signal indicates that said motor is coasting.

4. The improvement set forth in claim 1 as applied to a drive system comprising a motor for driving a motor vehicle, wherein
a motor load sensor for delivering to said computer a motor load signal representing the load on said motor is connected to said computer and said computer is arranged to inhibit said final control element against a change from one of said modes to the other when said motor load signal indicates that said motor is disconnected from the remainder of said drive system.

5. The improvement set forth in claim 1, wherein
axle load sensor means for delivering to said computer axle load signals representing the axle loads of a vehicle comprising said drive system are connected to said computer and said computer is arranged to derive said current reference speed differences from said stored characteristic speed differences in dependence on said axle load signals.

6. The improvement set forth in claim 1, wherein
a brake application sensor is provided for delivering to said computer a brake application signal indicating a brake application in a vehicle comprising said drive system, a speed of travel sensor for delivering to said computer a speed of travel signal representing the speed of travel of said vehicle is connected to said computer, and said computer is operable to cause said final control element to effect a change from the four-wheel drive mode to the two-wheel drive mode in response to a brake application when said speed of travel exceeds a predetermined value.

* * * * *